Patented Nov. 6, 1928.

1,690,680

UNITED STATES PATENT OFFICE.

JOSEPH E. HIRSH, OF BROOKLYN, AND ARTHUR D. ROBSON, OF NEW YORK, N. Y., ASSIGNORS TO STANDARD VARNISH WORKS, OF NEW YORK, N. Y., A CORPORATION OF NEW YORK.

COMPOSITION FOR POLISHING SURFACES COMPOSED OF CELLULOSE-ESTER COMPOSITIONS.

No Drawing.   Application filed March 10, 1927.   Serial No. 174,405.

This invention relates to improvements in compositions for smoothing, levelling and polishing surfaces composed of cellulose ester compositions. More particularly, this invention relates to an improved composition for smoothing and polishing surfaces lacquered with lacquer compositions containing cellulose nitrate or similar cellulose esters. The improved method for finishing surfaces composed of cellulose ester compositions described herein is described and claimed in Letters Patent No. 1,621,780 issued to the Standard Varnish Works March 22, 1927, on our application co-pending herewith.

Cellulose nitrate lacquers usually contain the cellulose nitrate in solution in a volatile solvent and the lacquer coat is hardened by evaporation of the solvent after application. The lacquer may also contain pigments, as well as gums and plasticizers for imparting special properties to the lacquer. These lacquers may be applied by different methods, such as dipping, brushing, spraying or flowing. They are, however, very quick drying and cannot be worked to a smooth finish in the manner of ordinary paints, enamels or varnishes. Likewise, if the lacquer contains a pigment, it tends to dry to a relatively dull finish due to its thin nature. Moreover, where a series of successive coats of the lacquer are to be applied, spraying is commonly resorted to in order to minimize the effect of the solvent in the successive coats as they are applied upon the previously deposited lacquer composition and this method of application results in a roughened or finely pebbled surface. Unlike coating compositions which contain a drying oil and which harden or undergo a chemical change on exposure to the air in a relatively slow manner, such lacquers harden quickly by evaporation of the solvent and the cellulose nitrate component of such lacquer compositions undergoes no change upon evaporation of the solvent and will readily go into solution again if contacted with a solvent for too long a period. The application of such a lacquer coat to produce a high gloss has, due to the characteristics of lacquers of this class, necessitated the use of a polishing operation to remove any roughness due to the methods of application employed and the drying characteristics of the lacquer and to produce a finish of high gloss and lustre.

The methods hitherto proposed for polishing such lacquered surfaces have involved the use of abrasives, usually applied together with an inert lubricating liquid such as water or paraffin oil. Such methods, however, have required an excessive amount of time and labor to produce a smooth finish, especially upon irregularly shaped objects involving a manual operation and moreover, have been unsatisfactory in that the finished surface produced is often marred by scratches or polishing marks and has a polish more or less deficient in gloss and lustre.

We have discovered that the smoothing and polishing operation can be improved and greatly accelerated, and surfaces of excellent finish and high lustre rapidly produced, by simultaneously subjecting the lacquered surface to a softening action and an abrasive action.

In the process of the present invention, accordingly, we carry out the polishing operation while treating the lacquered surface with a softening agent for the cellulose ester component of the lacquer composition. The polishing operation of the invention may be carried out with an abrasive, although for the production of a high gloss finish the abrasive action of a polishing pad or buffing wheel applied with pressure is frequently sufficient. The softening agent employed in carrying out the process of the invention may also have lubricating properties and may further promote the polishing operation in this way; or a separate lubricant may also be used during the polishing operation.

We have further found it advantageous to employ a softening agent having a controlled and restricted action upon the lacquer composition to prevent scarring or marring or misplacement of the lacquer coat during the polishing operation due to too great a softening or solvent action. For this purpose, we employ a mixture including an inert diluent or lubricant together with a softening agent for the cellulose ester component of the lacquer composition. The softening effect of such a mixture can be closely regulated by adjusting the proportion of the softening agent to that of the inert diluent or lubricant; while, at the same time, where an inert lubricant is employed with the softening agent, lubricating properties are also imparted to the polishing composition.

Various softening agents may be employed in carrying out the process of the present invention, and the softening agent used should be chosen to suit the nature of the surface being treated and the finish desired. In general, materials having a swelling, gelatinizing or solvent action upon the cellulose ester component of the lacquer composition may be employed. The amount employed should be sufficient to render the surface readily amenable to the polishing operation without however appreciably dissolving or dispersing the lacquer or removing it from the surface. We have found ethyl acetate, butyl acetate, cresyl phosphate, acetone, and diacetone alcohol particuularly advantageaus for this purpose. Ethyl lactate, tri-acetin, glyceryl benzoate, benzyl benzoate, diethyl phthalate, phenyl phosphate, napthyl phosphate, ethyl methyl ketone, methyl alcohol, butyl alcohol, chloroform, chloral, diethyl ether, diphenyl ether and anisole are also useful as softeners of such lacquer compositions.

In combination or admixture with these softening agents we have found linseed oil, tung oil, soya bean oil, paraffin, kerosene, and beeswax to be advantageous as inert diluents or lubricants. Olive oil, cotton seed oil, peanut oil, lard oil, neat'sfoot oil, menhaden oil, sperm oil, porpoise oil, crude petroleum, petroleum greases, glycerin, carnauba wax and Montan wax are also useful as diluents or lubricants.

In treating lacquer finishes containing gums, the softening agent may also have a softening effect upon the gum component of the lacquer composition and may assist the polishing operation in this way. In the treatment of lacquer compositions including gum constituents, we have also found that the use of a polishing composition including benzol, toluol or zylol is also advantageous, these aromatic hydrocarbons apparently further promoting the polishing action of the composition by such a softening effect upon the gum constituents of the lacquer composition. We have also used turpentine as a diluent or a lubricant in the improved polishing composition of the invention, but we have found that it apparently also exerts a softening action upon cellulose esters and that in some cases it can be employed as the softening agent in admixture with a suitable diluent or lubricant.

While inert diluents or lubricants of the different types described are all more or less useful in carrying out the process of the invention, certain of these materials have properties which render them better suited for use in this connection than others. A softening agent and a diluent or lubricant which are mutually immiscible may be employed together by emulsifying the mixture or otherwise dispersing the softening agent through the diluent or lubricant, but we have found it advantageous to use a diluent or lubricant which will dissolve the softening agent employed. Likewise, by using a diluent or lubricant which is substantially non-volatile at ordinary temperatures, the action of the polishing composition is rendered more uniform and it may be used without special precautions to take care of vaporized constituents; and if a volatile softening agent is employed such a non-volatile diluent or lubricant also assists in inhibiting vaporization of the softening agent. The viscous or oily or waxy diluents are especially valuable due to their lubricating properties and the use of compositions including diluents of this character contributes to the smoothness and gloss of the finish obtained. We have also found it useful to employ diluents or lubricants which are substantially immiscible with water.

In addition to the mixtures described above, there are some natural mixtures and crude products which combine a softening action and a diluting and lubricating action, probably due to the presence of different constituents contributing these different properties to the mixture, which may be employed directly in carrying out the process of the invention. We have found, for example, that the conifer oils boiling above turpentine may be employed in the treatment of cellulose nitrate containing lacquer compositions. In particular, we have found a pine oil having a specific gravity between about 0.900 and 0.925 and about 50% distilling off between about 200° to 215° C. to be specially advantageous for polishing surfaces composed of cellulose nitrate in accordance with this invention. Other natural mixtures which are useful in carrying out the process of the invention are camphor oil, cedar oil and lemon-grass oil.

Any of the ordinary abrasives, in a suitable state of division, may be used, such as sand, pumice, tripoli, carborundum or rotten stone. These abrasives are used in a finely divided state and the grade of the abrasive can be chosen to suit the finish desired, that is a finer abrasive is employed for a smoother and higher gloss finish, in the usual way. These abrasives may be applied to the surface to be polished in connection with paper, felt, cloth or fibre pads, blocks or wheels or similar polishing means, or in the form of prepared sand paper, emery paper, emery cloth, or the like in which the abrasive is fixed to a backing material. In polishing to get a high lustre, such abrasives can in some cases be dispensed with, and the abrasive action of the polishing means alone can be relied upon. It will be apparent that progressively finer abrasives can be used as the polishing operation proceeds and that the polishing operation can be concluded with a very fine abrasive or without any abrasive other than the action of the polishing or buffing means.

The composition of the polishing compound is adjusted in accordance with the character of the finish desired and the character of polishing operation, and also with reference to the composition of the lacquer being polished. In general a polishing compound including a diluent or a lubricant in predominating amount is employed. For example, for polishing a surface lacquered with a lacquer comprising 90 parts of pure cellulose nitrate and 10 parts of pigment, we have used a mixture containing 55 parts of linseed oil and 45 parts of commercial ethyl acetate (85%) together with an equal weight of finely powdered pumice stone. For polishing a surface lacquered with a lacquer composed of 100 parts cellulose nitrate, 20 parts of pigment, 40 parts of tricresyl phosphate and 20 parts of ester gum we have used a mixture containing 85 parts of linseed oil, 15 parts of commercial ethyl acetate and about an equal weight of powdered pumice. The process of the invention is useful for polishing both clear and pigmented lacquer finishes.

The polishing operation may be carried out in different ways. For example, the lacquered surface may be rubbed with a pad which is wet with a mixture of the softening agent and diluent or lubricant and then dipped in the abrasive before it is applied, or the polishing means may be supplied with the polishing composition in the form of a paste or suspension. The polishing composition may be removed as the polishing operation progresses, or the composition may be allowed to dry on the lacquered surface and subsequently removed and the surface subjected to a further finishing polish. The polishing operation may also be carried out with a buffing or polishing wheel to which the polishing composition is supplied and the operation concluded with a dry buffing or polishing wheel. The usual polishing methods can, in general, be used, although when carried out in accordance with the present invention the amount of time required may be materially reduced. Following the polishing operation, the surface may be waxed if desired in much the usual way.

The composition of the present invention is of special value and application in finishing lacquered metallic surfaces, such as automobile bodies and parts and the like.

While the present invention has been described particularly in connection with the treatment of cellulose nitrate lacquer finishes, it will be apparent that it may also be applied to smoothing, levelling and polishing lacquer finishes containing other cellulose esters, such as cellulose acetate; although in each case the softening agent should be chosen with reference to the particular cellulose ester constituent or constituents of the lacquer composition to be treated.

The composition of the present invention is also useful for finishing and polishing objects and articles made of compositions containing cellulose esters as well as lacquered surfaces. Such objects may include sheets, rods or molded articles prepared in the usual way by thermoplastic means from pyroxylin or cellulose acetate masses or the like. One method of treating small articles of this nature is to tumble them in a drum together with the polishing composition of the invention. For example, small celluloid articles may be introduced into a drum containing an equal weight of sawdust to which has been added ¼ of its weight of a paste containing 85 parts of tung oil, 15 parts of ethyl acetate and an equal weight of finely powdered pumice, the drum rotated for 15 minutes, the contents discharged and separated from the sawdust, and tumbled again for another 15 minutes with clean sawdust.

We claim:

1. An improved levelling, smoothing, and polishing composition comprising a cellulose ester softening agent, an inert diluent or lubricant, and an abrasive.

2. An improved levelling, smoothing, and polishing composition comprising a cellulose ester softening agent, an inert substantially non-volatile diluent or lubricant, and an abrasive.

3. An improved levelling, smoothing, and polishing composition comprising a cellulose ester softening agent, and an inert substantially non-volatile diluent or lubricant.

4. An improved levelling, smoothing, and polishing composition comprising a cellulose ester softening agent, an abrasive, and a predominating amount of an inert diluent or lubricant.

5. An improved levelling, smoothing, and polishing composition comprising a cellulose ester softening agent, and a predominating amount of an inert substantially non-volatile diluent or lubricant.

In testimony whereof I affix my signature.

JOSEPH E. HIRSH.

In testimony whereof I affix my signature.

ARTHUR D. ROBSON.